(12) United States Patent
Dilts

(10) Patent No.: US 6,929,591 B2
(45) Date of Patent: Aug. 16, 2005

(54) TOOL STORAGE HOLSTER

(75) Inventor: Timothy Dilts, Brampton (CA)

(73) Assignee: MacDonald, Dettwiler and Associates Inc., Brampton (CA)

(*) Notice: Subject to any disclaimer, the term of this patent is extended or adjusted under 35 U.S.C. 154(b) by 220 days.

(21) Appl. No.: 10/319,919

(22) Filed: Dec. 16, 2002

(65) Prior Publication Data
US 2004/0112849 A1 Jun. 17, 2004

(51) Int. Cl.[7] .............................................. B23Q 3/155
(52) U.S. Cl. ........................ 483/59; 483/58; 409/233; 409/232
(58) Field of Search ............................ 483/59, 16, 58, 483/901, 65; 409/233, 232; 279/22, 30, 35, 36, 107; 901/41

(56) References Cited

U.S. PATENT DOCUMENTS

| | | | | |
|---|---|---|---|---|
| 3,955,471 A | * | 5/1976 | Frazier | 409/233 |
| 4,135,848 A | * | 1/1979 | Hughes et al. | 409/233 |
| 4,677,719 A | * | 7/1987 | Link | 409/233 |
| 4,764,064 A | * | 8/1988 | Grienke | 409/233 |
| 4,773,815 A | * | 9/1988 | Lemelson | 483/901 |
| 4,777,715 A | * | 10/1988 | Roberts | 483/30 |
| 4,897,014 A | * | 1/1990 | Tietze | 483/901 |
| 4,915,553 A | * | 4/1990 | Lazarevic | 409/233 |
| 4,993,139 A | * | 2/1991 | Burry et al. | 483/901 |
| 5,044,063 A | * | 9/1991 | Voellmer | 483/59 |
| 5,409,322 A | * | 4/1995 | Horikawa et al. | 409/233 |
| 5,820,538 A | * | 10/1998 | Watkinson | 483/59 |
| 5,971,681 A | * | 10/1999 | Wolfe et al. | 409/233 |

FOREIGN PATENT DOCUMENTS

EP  416524 A1 * 3/1991 ........... B23Q/3/155

* cited by examiner

Primary Examiner—Derris H. Banks
Assistant Examiner—Dana Ross
(74) Attorney, Agent, or Firm—David J. French

(57) ABSTRACT

A tool holster resiliently engages with a tool upon its insertion with the holster. Positive retention is obtained by rotating a threaded shaft to advance a cam to rotate levers to engage the tool. The lever arms are split to allow a degree of misalignment. Springs bias the arms towards engagement of the tool. This provides an initial resilient entrapment of the tool. Advancement of the threaded shaft causes the cam to close-up the misalignment in the lever arm portions until your removable retention of the total is cheap, a "hard dock". This final positive retention may contain a small amount of sprung resilience to allow for some overload protection of the mechanism and tool due to an external disturbance (example robot runaway) before rigid retention is engaged.

25 Claims, 4 Drawing Sheets

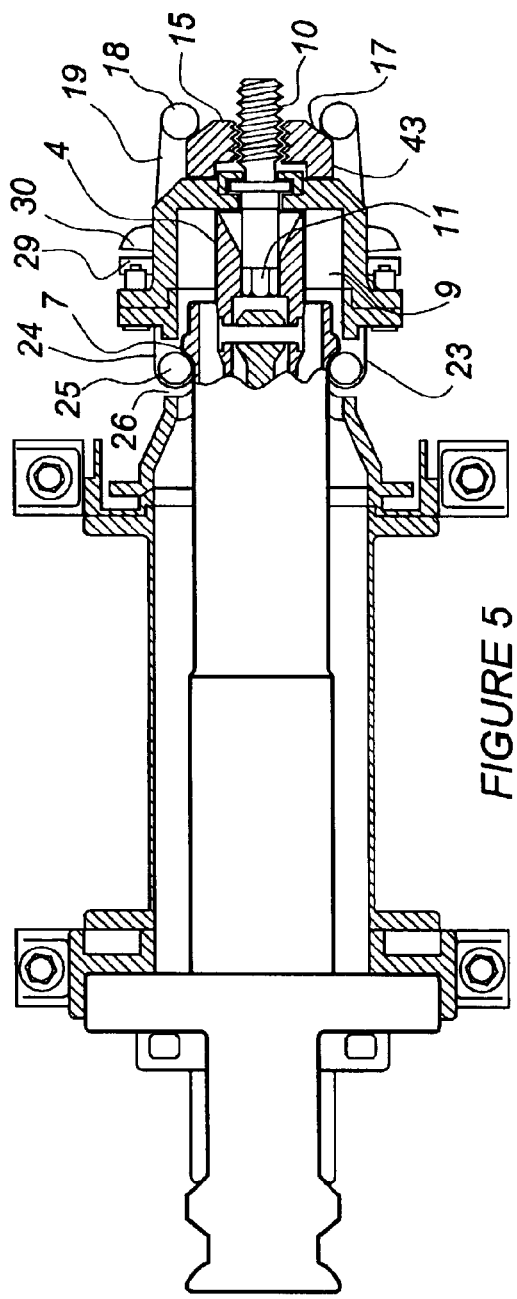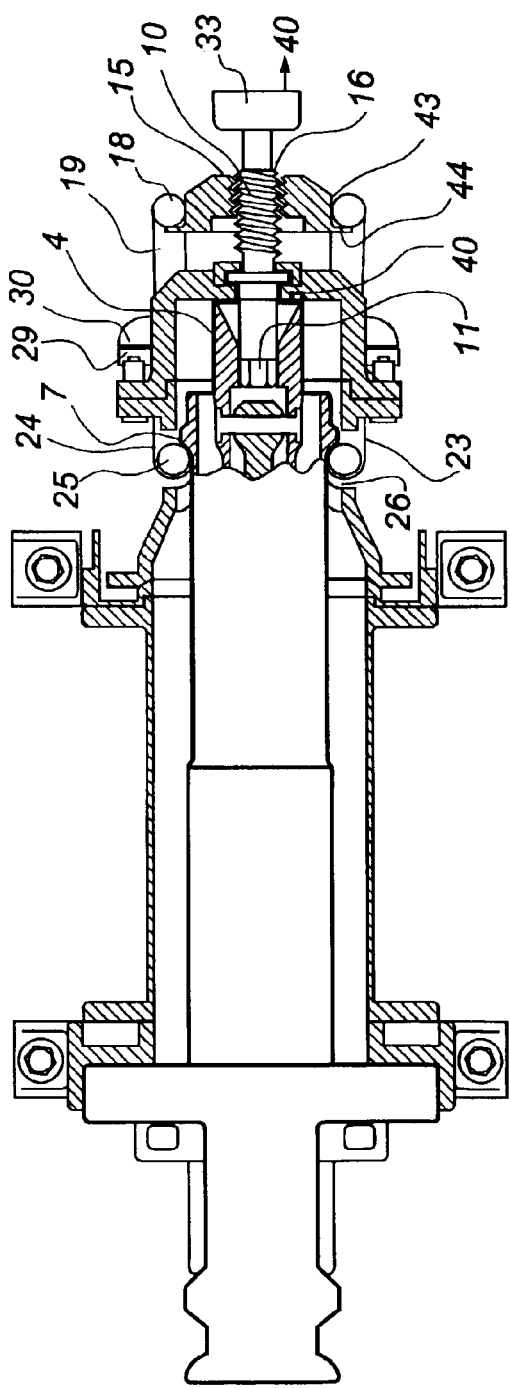

TOOL STORAGE HOLSTER

FIELD OF THE INVENTION

This invention relates to a storage container or holster for a tool. More particularly, it concerns a positive engagement system that is suited for storing a tool on the outside of an extraterrestrial vehicle in a zero gravity environment, or in a high vibration environment.

BACKGROUND TO THE INVENTION

In the field of orbital robotics a number of specialized tools are required to perform specific tasks. This requires the robot to be able to interchange tools by either storing or retrieving them from a storage device herein referred to as an "holster". The holster is used to protect a tool during storage and provides a means for retaining it.

In zero gravity environments it is not desirable to rely on resilient members, such as springs, to provide the primary retention for a stored tool. Temperature conditions can range from −40 to +100° C. and retention of a tool in such applications must be absolutely positive.

Tool storage effected by robots must also provide for the contingency of robotic runaway. While robots carry sensors to detect the application of excessive loads, as when an attempt is made to extract a stored tool that is fully retained, it is desirable for the retention means to provide some slack or freedom of motion to the retained tool. This allows time for robotic overload sensors to operate and limits the extent to which a focus of stress for a momentary overload will exist. This feature is called compliance for over-load protection.

Further features that are desirable in a tool holster include a soft-docking, preliminary, resilient engagement of a tool before positive, hard-docking retention is established. The following invention provides such features in addressing the above objectives.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to one aspect of the invention in a general sense, a tool holster is provided which includes:

(1) a containment cavity within a storage case with an opening to receive a tool to be stored, the tool having an engagement surface by which it may be retained once inserted into the cavity;

(2) engagement means for retaining the tool by contact with the engagement surface on the tool, the engagement means including a pivoting lever arm positioned to act as a first class lever about a pivot point, such arm having an engaging end proximate the tool storage location on one side of the pivot point and an actuating end on the other side of the pivot point; and (3) a cam actuated to travel along a path that will cause the cam to bear against the actuating end of the lever arm whereby, upon actuating of the cam, the engaging end of the lever arm will advance towards the containment cavity to bear against the engagement surface on a tool when present therein and effect positive retention or hard-docking of the tool within the cavity.

In a preferred arrangement, the actuation of the cam is effected by a threaded shaft anchored on the storage case and threadably engaged with the cam. A thread-driver coupling may be present at any convenient location along the length of the shaft, including at a location within the cavity or at an end of the shaft that is remote from the cavity. In the latter case, a rotary actuation means may be provided by an externally mounted motor to rotate the threaded shaft. In the case where the thread-driver coupling—e.g. a bolt head, is located within the cavity, the stored tool may be shaped to engage the thread-driver coupling whereby rotation of the stored tool will rotate the threaded shaft.

A tool-engagement resilient means, such as a spring, is positioned to bias the engaging end of the lever arm towards contact with the engagement surface on the tool when the tool is inserted into the cavity. Preferably, this contact is effected through a tool-engaging roller fitted at the tool engagement end of the pivoting lever arm. To minimize resistance to advancement of the cam, the cam-engaging end of the pivoting lever arm may be fitted with a cam roller for bearing on the camming surface. To allow for the insertion of the tool, the lever arm must have sufficient freedom of rotary motion to allow the engagement surface of the tool to penetrate the cavity to the docking position. Correspondingly, the cam must be positioned or shaped to permit such motion at the engaging end of the pivot arm. With the tool-engaging spring means present, the cam may be suitably positioned so that the tool-engagement roller bears, initially, in a resilient manner against the engagement surface on the tool providing a "soft" docking effect that allows for insertion and withdrawal of the tool.

In order to achieve a "hard" docking, the cam may be further advanced so that the tool-engaging roller fully engages the engagement surface on the tool. Compliance for this hard docking mode may be established by providing the pivoting lever arm with two legs or arm portions that are divided to allow a degree of independent rotary freedom for both legs of the arm on opposed sides of the pivot point. By splitting the lever arm into two portions the tool-engaging arm portion is provided with a range of rotational movement about the pivot point even with cam roller in contact with the cam. By limiting this range of pivoting rotation, the tool-engaging roller is restrained from over-advancement into the containment cavity prior to insertion of the tool. As well, such range of rotational movement may permit slight movement, e.g. retraction, of the tool under resilient resistance, while the tool remains fully captured. Flange engagement portions on each arm portion are positioned to oppose each other, requiring each arm portion to rotate with the other about the pivot point, but with a degree of play. This play permits the limited range of rotational motion. A further cam-side resilient means, such as a further spring, preferably stronger than the tool-engagement resilient means, is coupled to the cam-side leg of the arm portions, biasing such legs to rest in contact with the cam through the cam roller.

While reference has been made in the foregoing to a single pivoting lever arm and spring, the invention may be implemented with multiple elements, preferable symmetrically deployed. Further, while exemplified hereafter by closing rollers as engagement means, engagement may also be effected by means that expand within a cavity of the tool being stored to contact an engagement surface present within the cavity.

The foregoing summarizes the principal features of the invention and some of its optional aspects. The invention may be further understood by the description of the preferred embodiments, in conjunction with the drawings, which now follow.

SUMMARY OF THE FIGURES

FIG. 5 is a view as in FIG. 2 with the engagement protrusion on the tool sleeve resiliently captured by the tool engagement rollers for an initial soft docking.

FIG. 6 is a view as in FIG. 5 with the tool fully advanced to engage and rotate a shaft that has been rotated to place the engagement rollers in a fully captured, hard docking configuration.

DESCRIPTION OF THE PREFERRED EMBODIMENT

Figure 1:
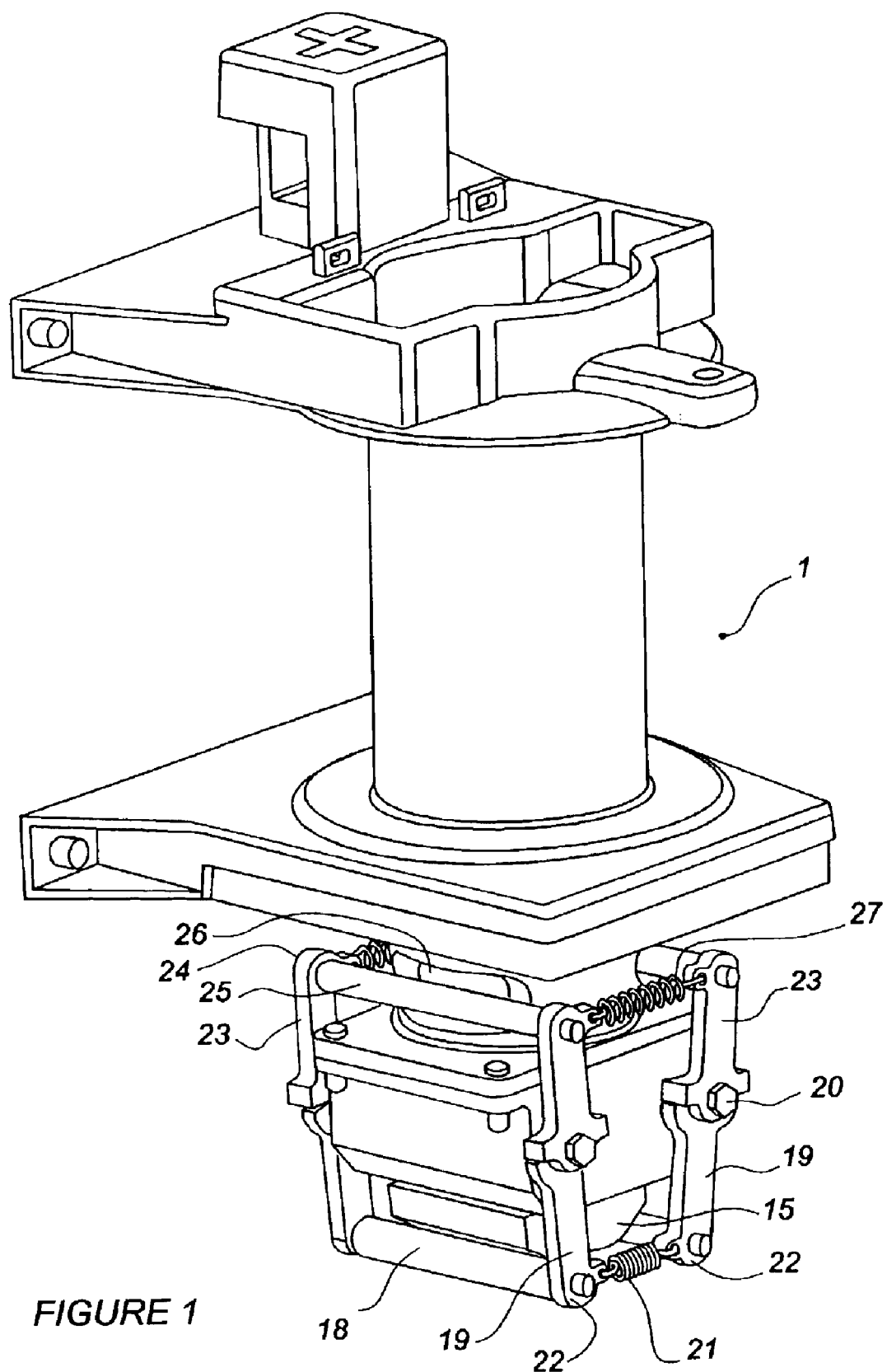
FIG. 1 is a pictorial view of a tool holster with its tool engaging mechanism exposed.
Figure 2:
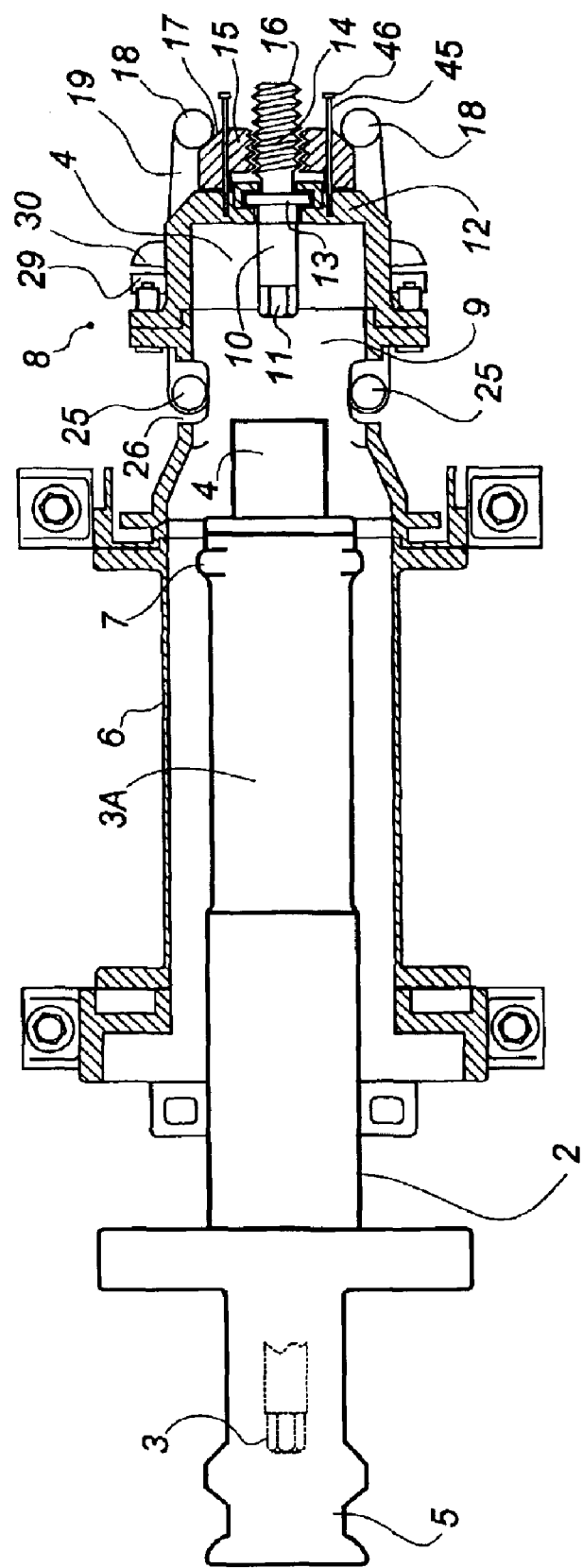
FIG. 2 is a partial cross-sectional view of the holster of FIG. 1 with a tool partially inserted into the holster.

FIG. 1 depicts a tool holster assembly 1 with outer covers removed. As shown in partial cross section in FIG. 2, a tool 2 in the form of a nut-driver shaft 3 and surrounding sleeve 3A with a socket 4 at one end and an engagement fixture 5 at the other end is partially inserted into a containment cylinder 6. The sleeve 3A has an enlarged, annular or partially annular protrusion 7, preferably ramped on the engagement fixture side, located rearwardly from but proximate to the socket 4. The tool 2 in FIG. 2 is shown approaching, but not yet engaged with the tool retention assembly 8.

The tool retention assembly 8 has a tool-end reception well 9 to serve as the tool storage location. This well 9, which is part of the containment cavity for the tool, optionally terminates with a shaft 10 that is optionally fitted with a nut-shaped inner end 11. This shaft 10 penetrates the well-end 12 and is held in place in the well end by retainer means 13 that permit the shaft 10 to rotate. A portion of the shaft 10 is threaded 14 for engagement with a camming block 15 which serves as a cam. The camming block 15 is constrained against rotation so that rotation of the shaft 10 will cause the camming block 15 to advance and retire. An extension portion 16 of the shaft 10 protrudes beyond the camming block 15 providing travel for the block 15.

The camming block 15 has two sloping camming surfaces 17 that bear against a pair of cam rollers 18 coupled to actuating ends of cam-engaging linkage arms 19 on each side of the block 15. Advancement of the block 15 causes the rollers 18 to be spread apart, rotating a set of four, hinged, cam-engaging linkage arms 19 to which the rollers 18 are journaled by bearings. As best seen in FIG. 1 a set of cam-engaging retention springs 21 extend between the outer ends 22 of the first linkage arms 19 in pairs, drawing the cam rollers 18 towards each other. These cam-engaging retention springs 21 can be paired for balanced or symmetrical application of force, but any spring means 21 that will draw the cam rollers 18 together will suffice. For security, multiple springs may be employed.

The first set of linkage arms 19 pivot about pivot pins 20 at their ends that are remote from the cam rollers 18. A further set of tool-engaging linkage arms 23 also pivot about pins 20 each at one of their respective ends. The other roller ends 24 of the second tool-engaging linkage arms 23 carry at their engagement ends a pair of journally-mounted tool-engaging rollers 25 that are positioned on opposite sides of the well 9, accessing the interior space or cavity within the well 9 through well-side openings 26. The roller ends 24 of the tool-engaging linkage arms 23 are coupled by a set of tool-engaging retention springs 27 that tend to draw the tool-engaging rollers 25 towards each other, into the interior space within the well 9. The cam-engaging retention springs 21 are preferably stronger in their effect that the tool-engaging retention springs 27. This is to ensure that the cam rollers 18 always remain in contact with the cam block 15, thus biasing the tool-engaging rollers 25 away from the tool unless advanced by the camming block 15 into contact with the tool.

Figure 4:
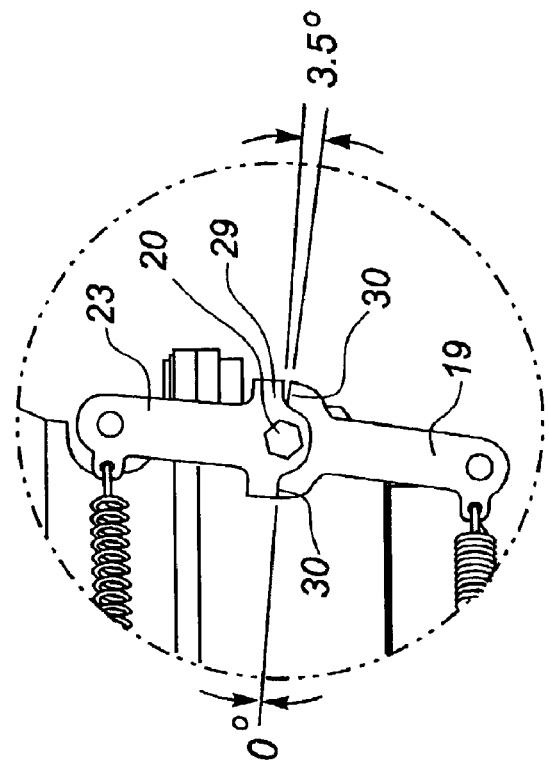
FIG. 4 is a detailed plan view close-up of the divided pivot arm employed in the mechanism of FIG. 3, depicting the play permitted between the pivot arm leg portions.
Figure 3:
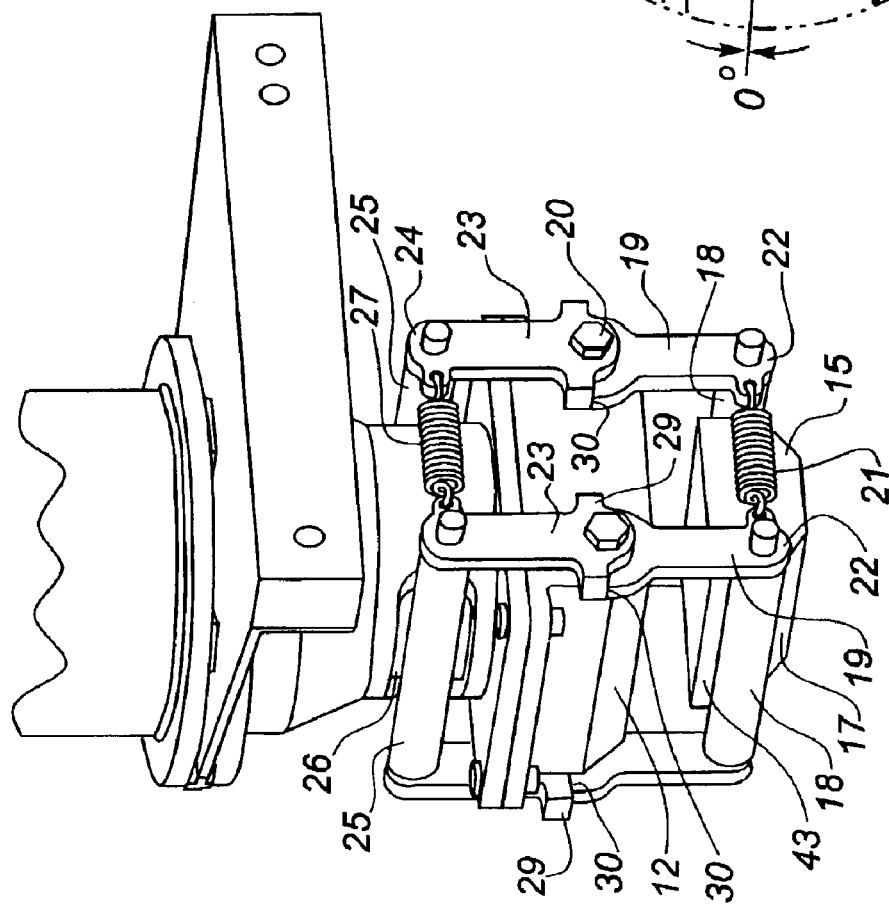
FIG. 3 is a pictorial view of the engagement mechanism components of FIG. 1 with the cam advanced for full engagement of the tool.

The first and second sets of arms 19, 23 are free for limited rotation about pins 20, e.g. from about 3.5 degrees to 10 degrees without interference with each other. However, engagement flanges 29 on one set of arms, eg. 23, extend down to oppose, and upon sufficient rotation of such arms 23, bear against flange engagement faces 30 carried by the ends of the other set of arms, eg. 19, as flange engagement portions on such arms. These arms 19, 23 are therefore forced to rotate with each other once the flanges 29 on the ends of one arm bear against the engagement faces 30 on the ends of the other arm. Collectively the arms 19, 23 with their rollers 18, 25 constitute a pivoting lever arm means. Such flanges 29 and faces 30 are present on both sides of the pivot ends of the arms 19, 23 to enforce joint rotation in both directions, while permitting each arm to have a limited sector or range of rotation with respect to the other arm. A preferred permitted range of freedom, as depicted in FIG. 4 is approximately 3.5 degrees to 10 degrees but may be as little as near zero degrees.

Once the socket end 4 of the tool 2 has advanced into the well 9 as shown in FIGS. 5 and 6, the annular protrusion 7 with its ramped sides has passed beneath the second pair of tool-engagement rollers 25. As these rollers 25 are mounted for pivoting about pivot pins 20, and so long as cam 15 is not excessively advanced, the play between the arms 19, 23 allows the retention rollers 25 to spread to admit the enlarged diameter of the annular protrusion 7, subject to the second linkage arms 23 being within their permitted sector for rotational movement. This establishes a soft docking configuration.

Due to the presence of the set of tool-engaging retention springs 27, the rollers 25 will separate resiliently. With the retention rollers 25 appropriately positioned, this will be felt by a user, such as a robot, as a momentary resistance to insertion of the tool 2. After the protrusion 7 passes the retention rollers 25, the tool will be engaged, having achieved a soft docking within the tool holster assembly. This condition is shown in FIG. 5.

Advancement of the socket 4 in this process has meanwhile engaged the nut-shaped end 11 on shaft 10. Rotation of the socket 4 through application of torque to the nut driver shaft 3 will rotate the shaft 10 and advance the camming block 15. This, in turn will spread the cam rollers 18 and pivot the cam-engaging linkage arms 19. Initially, if they have not been previously advanced for a soft docking, as the cam-engaging linking arms 19 rotate the tool-engaging linkage arms 23 will pivot at the same rate, while the angle between the flanges 29 and the faces 30 will remain constant. This causes the tool-engaging linkage arms 23 to rotate in the direction for advancing the tool-engaging rollers 25 into the interior volume of the well 9 through well-side openings 26. Eventually, tool-engaging rollers 25 become positioned to grasp on the engagement surface sides of the sleeve 3A, behind the protrusion 7, remote from the socket 4. The angular relationship between the linkage arms 19, 23 will remain unchanged until the retention rollers 25 make contact with back ramped face of the protrusion 7 on the tool sleeve 3A. whereat the soft docking configuration is established. Thereafter, as the cam-engaging linkage arms 19 continue to rotate, the tool-engaging linkage arms 23 will be restricted from rotating, leading eventually to a hard docking configuration.

Advancement of the camming block 15 may be adjusted so that the sector of free of rotation will be reduced to a minimum, but not fully eliminated. In this configuration, the flanges 29 and faces 30 will almost make contact with each other. The tool is now irremovably retained within the tool holster assembly 1, a hard docking, but with a feature which will permit a small amount of compliance in the event of a disturbance. In the event of an external disturbance (example robot runaway), as the tool is withdrawn axially outwards in the tool holster assembly 1, the residual gap between flanges 29 and faces 30, and springs 27, allows a small, resilient movement of the tool-engaging linkages 23 about the pivot 20. This causes the final sector of free rotation to be consumed as the flanges 29 come into full contact with the faces 30. Notwithstanding this small, permitted, displacement, the tool 2 is still irremovably retained within the holster assembly 1—hard docking.

Optionally, the camming block 15 may provide a land or seating surface 43 on which the roller 18 may rest when it is in hard docking position. This land 43 may allow the necessary small amount of play in the engagement of the tool, eg 35–70 thousands of an inch, to provide compliance that will accommodate "robot runaway".

While socket 4 is shown as turning the shaft 10 this is merely one means for actuating this threaded shaft 10. A rotary actuator 33, eg. an electrical motor as shown in FIG. 6, may be coupled to the exterior, protruding extension portion 16 of the shaft 10, to advance the camming block 15 in response to an electrical signal to positively engage an inserted tool. In such case, the nut end 11 would be omitted or the socket 4 would turn passively. This signal may be provided by a switch 40 that is activated by the seating of the tool at the tool storage location.

Mechanical stops 44 on the seating surface 43 may optionally be present to prevent over-advancement of the camming block 15. Alternately or further, over advancement of the camming block 15 may be prevented by motion-limiting bolts 45 seated in the well end 12 that pass through the camming block 15, terminating with heads 46 as shown in FIG. 2 that limit outward over extension of the camming block 15.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The Embodiments of the Invention in which an Exclusive Property or Privilege is Claimed are Defined as Follows:

1. A tool holster comprising:
    a) a containment cavity within a storage case with an opening to receive a portion of a tool to be stored at a tool storage location, the tool having an engagement surface by which it may be retained once inserted into the cavity;
    b) engagement means for retaining the tool by contact with the engagement surface on the tool, the engagement means including a pivoting lever arm means positioned to act as a first class lever about a pivot point, such arm means having a tool-engaging end proximate the tool storage location on one side of the pivot point and a cam-engaging actuating end on the other side of the pivot point;
    c) a cam actuated to travel along a path that will cause the cam to bear against the actuating end of the lever arm means;
    d) a threaded shaft threadably engaged with the storage case and connected to the cam for actuation of the cam; and
    e) a thread-driver coupling on the threaded shaft at a location within the cavity to receive a thread driver provided by a tool to be inserted into the holster
whereby, upon actuation of the cam, the tool-engaging end of the lever arm means will be brought to bear against the engagement surface on the tool and effect retention of the tool within the cavity.

2. A tool holster as in claim 1 comprising a rotary actuation means coupled to the threaded shaft to rotate the threaded shaft.

3. A tool holster as in claim 1 comprising tool-engagement resilient means positioned to bias the tool-engaging end of the lever pivoting arm means into resilient contact with the engagement surface on the tool when the tool is inserted into the cavity with the cam positioned to permit a soft docking engagement.

4. A tool holster as in claim 3 wherein the tool-engaging end of the pivot arm is fitted with a roller for bearing on the tool engagement surface.

5. A tool holster as in claim 4 wherein the cam-engaging end of the pivot arm is fitted with a roller for bearing on the cam surface.

6. A tool holster as in claim 5 comprising cam-engagement resilient means positioned to bias the cam engaging end of the lever pivoting arm means into resilient contact with the cam.

7. A tool holster as in claim 6 having two symmetrically mounted pairs of said pivoting lever arm means and pivot points deployed about the containment cavity.

8. A tool holster as in claim 7 having two symmetrically mounted pairs of said tool-engagement resilient means deployed about the containment cavity.

9. A tool holster as in claim 8 wherein the pivoting lever arm means is divided into two legs, a tool-engaging leg and a cam-engaging leg, to allow a limited degree of independent rotary freedom for both legs of the arm means on opposed sides of the pivot point, permitting sufficient freedom of rotary motion of the tool-engaging leg to allow the soft docking of the tool with the cam positioned for soft docking.

10. A tool holster as in claim 9 wherein the range of independent rotary freedom between said a legs permits the tool to penetrate the cavity to the docking position with said soft docking effect, but also permits hard docking engagement of the tool upon advancement of the cam to close-off the range of permitted rotary freedom between said respective legs, whereby the tool is firmly retained by the tool-engaging end of the pivot lever arm means in a hard docking.

11. A tool holster as in claim 10 wherein each leg of the lever arm means comprises flange contact means positioned to oppose each other, allowing each leg only a limited degree of independent rotary freedom about the pivot point with respect to the other leg, with a degree of permitted rotation to provide freedom for said tool to be inserted into said cavity with said soft docking engagement, but limiting the extent of relative rotary motion of respective legs of the lever arm means to permit subsequent hard docking engagement of the tool.

12. A tool holster as in claim 9 comprising a threaded shaft threadably engaged with the storage case and connected to the cam for actuation of the cam.

13. A tool holster as in claim 12 comprising a thread-driver coupling on the threaded shaft at a location within the cavity to receive a thread driver provided by a tool to be inserted into the holster.

14. A tool holster as in claim 12 comprising a rotary actuation means coupled to the threaded shaft to rotate the threaded shaft.

15. A tool holster comprising:
   a) a containment cavity within a storage case with an opening to receive a portion of a tool to be stored at a tool storage location, the tool having an engagement surface by which it may be retained once inserted into the cavity;
   b) engagement means for retaining the tool by contact with the engagement surface on the tool, the engagement means including a pivoting lever arm means positioned to act as a first class lever about a pivot point, such arm means having a tool-engaging end proximate the tool storage location on one side of the pivot point and a cam-engaging actuating end on the other side of the pivot point, the tool-engaging end being fitted with a roller for bearing on the tool engagement surface;
   c) a cam actuated to travel along a path that will cause the cam to bear against the actuating end of the lever arm means; and
   d) tool-engagement resilient means positioned to bias the tool-engaging end of the lever pivoting arm means into resilient contact with the engagement surface on the tool when the tool is inserted into the cavity with the cam positioned to permit a soft docking engagement.

16. A tool holster as in claim 15 wherein the cam engaging end of the pivot arm is fitted with a roller for bearing on the cam surface.

17. A tool holster as in claim 16 comprising cam-engagement resilient means positioned to bias, the cam-engaging end of the lever pivoting arm means into resilient contact with the cam.

18. A tool holster as in claim 17 having two symmetrically mounted pairs of said pivoting lever arm means and pivot points deployed about the containment cavity.

19. A tool holster as in claim 18 having two symmetrically mounted pairs of said tool-engagement resilient means deployed about the containment cavity.

20. A tool holster as in claim 19 wherein the pivoting lever arm means is divided into two legs, a tool-engaging leg and a cam-engaging leg, to allow a limited degree of independent rotary freedom for both legs of the arm means on opposed sides of the pivot point, permitting sufficient freedom of rotary motion of the tool-engaging leg to allow the soft docking of the tool with the cam positioned for soft docking.

21. A tool holster as in claim 20 wherein the range of independent rotary freedom between said, a legs permits the tool to penetrate the cavity to the docking position with said soft docking effect, but also permits hard docking engagement of the tool upon advancement of the cam to close-off the range of permitted rotary freedom between said respective legs, whereby the tool is firmly retained by the tool-engaging end of the pivot lever arm means in a hard docking.

22. A tool holster as in claim 21 wherein each leg of the lever arm means comprises flange contact means positioned to oppose each other, allowing each leg only a limited degree of independent rotary freedom about the pivot point with respect to the other leg, with a degree of permitted rotation to provide freedom for said tool to be inserted into said cavity with said soft docking engagement, but limiting the extent of relative rotary motion of respective legs of the lever arm means to permit subsequent hard docking engagement of the tool.

23. A tool holster as in claim 20 comprising a threaded shaft threadably engaged with the storage case and connected to the cam for actuation of the cam.

24. A tool holster as in claim 23 comprising a thread-driver coupling on the threaded shaft at a location within the cavity to receive a thread driver provided by a tool to be inserted into the holster.

25. A tool holster as in claim 23 comprising a rotary actuation means coupled to the threaded shaft to rotate the threaded shaft.

* * * * *

UNITED STATES PATENT AND TRADEMARK OFFICE
CERTIFICATE OF CORRECTION

PATENT NO. : 6,929,591 B2
DATED : August 16, 2005
INVENTOR(S) : Timothy Dilts

It is certified that error appears in the above-identified patent and that said Letters Patent is hereby corrected as shown below:

Title page,
Item [57], ABSTRACT,
Line 9, delete "your removable retention of the total is cheap, a hard dock" and insert -- a hard dock is achieved --.

Signed and Sealed this

Fourteenth Day of March, 2006

JON W. DUDAS
*Director of the United States Patent and Trademark Office*